Figure 1:
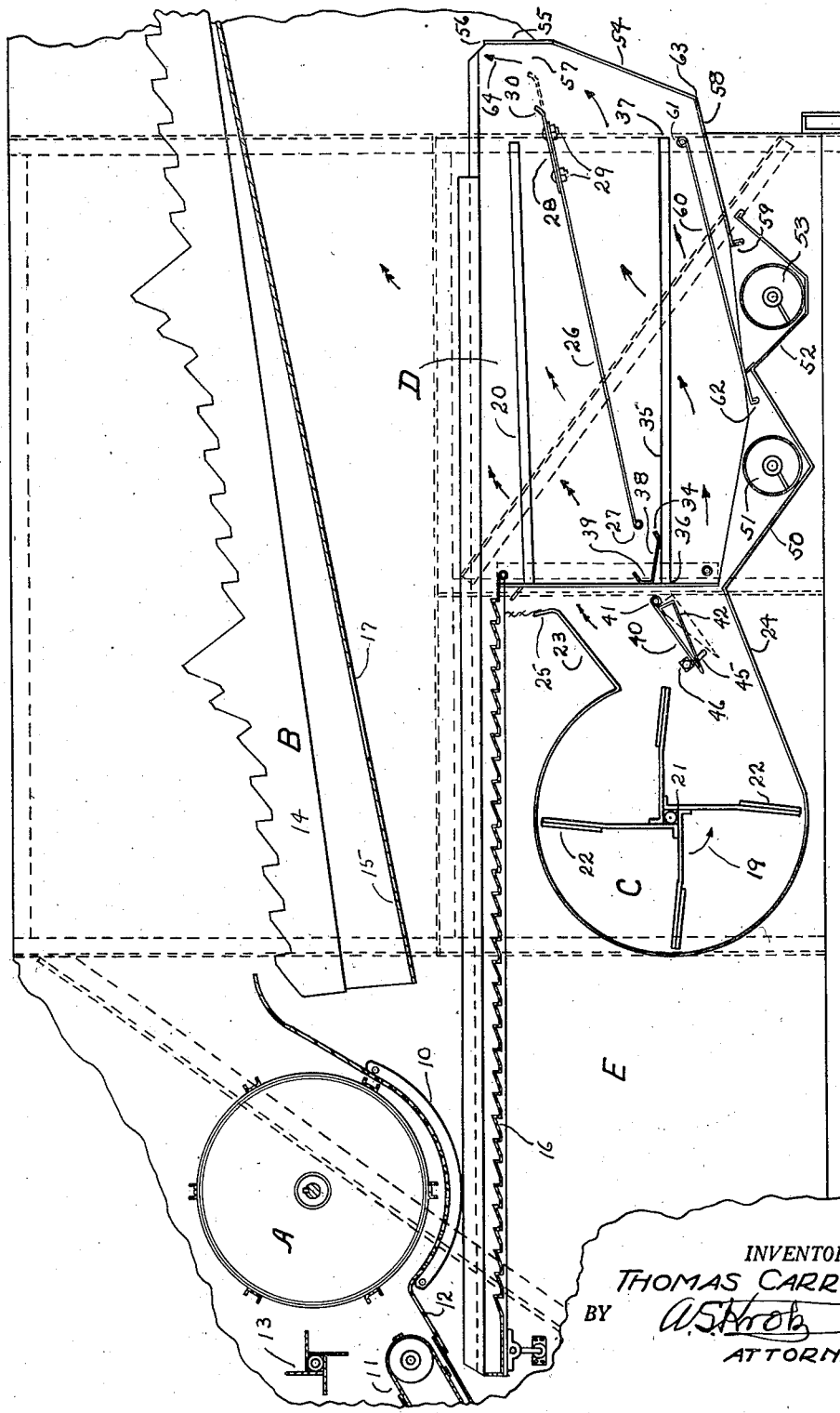

Feb. 19, 1946.  T. CARROLL  2,395,163
SHAKER SHOE FOR GRAIN THRESHERS
Filed March 22, 1943

INVENTOR.
THOMAS CARROLL
BY
ATTORNEY

Patented Feb. 19, 1946

2,395,163

UNITED STATES PATENT OFFICE 2,395,163

SHAKER SHOE FOR GRAIN THRESHERS

Thomas Carroll, Toronto, Ontario, Canada, assignor to Massey-Harris Co. Ltd., Toronto, Ontario, Canada, a corporation of Canada Application March 22, 1943, Serial No. 480,031

4 Claims. (Cl. 130—27)

The present invention relates to shaker shoes for combines and threshing machines and has for its object to provide a device which is more efficient, easier to keep in adjustment and can be manufactured at lower cost than conventional devices of the class.

One of the objects of the present invention is to provide a design wherein a single blower fan having an adjustable valve may be used in combination with a single shaker shoe which will operate more efficiently than a main shoe and a recleaning shoe with separate fans.

A further object of the present invention is to provide a closed tail gate for the shaker shoe and adjustable means on the rear end of the grain pan whereby adjustments can easily be made for flax, wheat, oats, barley and lighter grains and whereby grain cannot be blown out of the lower or recleaning compartment.

A still further object of my invention is to provide a chaffer sieve which may be nearly level whereby the blast of air as determined by an air directing valve will readily move the chaff to the discharge end of the shoe whereby any type of sieve may be used, either round holes, wire screen, lip sieves or sieves with a saw tooth section.

A particular object of my invention is to provide a shoe having a tail gate which can be opened or moved out of position for changing pans and sieves but being in a position to act in a manner which will prevent the loss of grain and insure the return of all of the tailings to the tailings conveyor and all clean grain to the clean grain conveyor.

Shaker shoes have been in use on threshers for many years. On many threshers, two shoes and two fans are used. In any event, the problem of separating the clean grain from the chaff and tailings is an intricate and difficult matter, particularly if high efficiency is desired. For example, as near as possible, it is desired that 100% of the grain be cleaned and delivered to the bin and that no clean grain be left mixed with the tailings or lost and that all of the tailings are returned to the thresher cylinder. The problem seems more difficult when it is realized that combines and threshing machines are generally operated by men that are not skilled in the art and that the more adjustments provided, the more difficult it is to secure maximum results.

In my device, I accomplish the desired results, even in the hands of unskilled help largely because of its simplicity. I have therefore limited the device to two major adjustments, each of which are easily understood by the operator and by providing parts which are not sensitive; that is, the device will give maximum results even though the adjustments are not minutely correct.

To these and other useful ends, my invention consists of parts, combinations of parts, or their equivalents, and mode of operation, as hereinafter set forth and claimed and shown in the accompanying drawing in which:

Fig. 1 illustrates fractionally a threshing machine equipped with my invention.

Reference character A designates the cylinder in its entirety. B designates the straw walkers and their grain moving pans in their entireties. The blower fan is designated in its entirety by reference character C. The shaker shoe is designated in its entirety by reference character D.

Cylinder A is provided with a concave 10 and means for feeding the grain into the cylinder and over the concave which generally includes a threshing elevator 11, a guide plate 12 and a beater 13.

Member B comprises conventional straw walkers 14, each pair being preferably equipped with a walker pan 15 shaped about as shown so the chaff and grain are delivered forwardly and fall by gravity on shaker shoe pan 16. This pan is preferably saw toothed and about the length shown and mounted on the shaker shoe so the grain and chaff will fall on its forward end from concave 10 and members 15 by gravity.

Member 16 need not be angled because the saw teeth will act to move the grain and chaff rearwardly and the oscillating movement will shake the grain to the bottom and the chaff to the top as it passes rearwardly and before falling on chaffer sieve 20; thus the grain and chaff is already separated when it reaches the rear end of member 16. The chaff being in rear of the grain as it falls to member 20, the wind blast will carry the chaff completely out of the machine and away from the grain which will go through the chaffer sieve without obstruction.

Blower fan C comprises a shaft 21 and a suitable structure adapted to carry plates 22 and is caused to turn in the direction indicated by curvilinear arrow 19. The outlet of the fan is formed by means of an upper plate 23 and a lower plate 24. Plate 23 is preferably turned upwardly at its rear end as at 25.

Member D is provided with a grain pan 26, the forward end terminating as at 27, the rear end having an extension 28 which is made longitudinally adjustable on member 26 and held in the adjusted position by means of bolts 29. Member 28 is turned upwardly at its rear end as at 30.

I provide a dressing sieve 35, the forward end terminating preferably as at 36 and the rear end preferably as at 37. A guide plate 38 is preferably provided having a short vertically arranged portion 39 and having an upturned rear side 34. This member acts as a receiver for the grain and chaff from member 26, the upturned edge 34 acting to separate the grain and chaff as it falls on member 35.

Directly in front of member 39, I pivot a gate valve 40 as at 41, the valve being provided with a rearwardly extending portion 42 which terminates as illustrated on a horizontal line with the bottom of member 35. The side panels of the member D are provided with slots 45 and locking means 46 for the valve is provided whereby the front end of this member may be raised and lowered so as to divert more or less air over or below members 26 and 35. I have shown valve 40 in its lowest position by means of dotted lines.

Adjacent the bottom of the shaker shoe, I provide a grain gathering trough 50 having an auger conveyor 51 for conveying the grain to the side of the thresher where it may be elevated to the grain bin.

A tailings pan 52 is provided having an auger conveyor 53 adapted to convey the tailings to the outside of the thresher housing from whence they may be elevated and delivered to a suitable distributing means above member A as is the custom in threshing machines. The rear end of the shaker shoe is provided with an end gate 54, the upper end 55 of which is substantially vertical terminating as at 56. Member 55 is positioned a short distance in rear of member 30 when member 30 is in its rearmost position as indicated by dotted lines, leaving an opening 57 through which the portion of the blast of air passing under valve 40 will be permitted to escape by moving vertically as indicated by arrow 64.

Tailings gate 54 is provided with a plate 58 terminating at its forward end as at 59 so all of the tailings collected will be fed into pan 52. A pan 60 is secured to the shaker shoe at its rear end as at 61 directly under and slightly in front of the rear end of member 35 terminating at its forward end as at 62.

It will be seen that all of the clean grain which falls through dressing sieve 35 will be delivered to the clean grain trough 50. All of the tailings gathered by the rear end gate will be delivered to trough 52 by plate 58.

Tailings gate 54 and its member 55 are removably attached (not shown) to the shaker shoe so members 20, 26 and 35 may be conveniently removed and replaced drawer-like. Member 54 may for convenience, be hinged as at 63 having locking means (not shown) at its upper end so it may be moved out of the way for this purpose or the tailings gate may be removed entirely for the purpose.

In my design, members 16, 20, 26, 35, 38 and 60 are necessarily mounted on member D. Valve 40 and its connecting parts may be mounted on member D as already described; however this valve may be mounted on the side panels of the thresher housing, room being provided between members 35, 39 and 41 for the movement of the shaker shoe. In either event, the operation of the device will be the same. Members B, as is the custom in conventional threshers, are given oscillating and circular movement by means (not shown) which is too well known to require further description. The exact shape of the sides of shaker shoe D and the means for oscillating the shoe (not shown) are too well known to require illustration or description.

It will be seen that an air blast will be directed over valve 40 as indicated by double pointed arrows and that the air blast under valve 40 will travel as indicated by single pointed arrows; thus to separate the grain from the chaff and catch all of the tailings.

It will be understood that the major part of the chaff and grain will be directed to the forward end of member 16 and that the lighter chaff and perhaps some of the grain not separated from the chaff may fall directly on member 16 through opening 17 in member 15; thus the major part of the grain and chaff will not be seriously influenced by the lighter and smaller portion of the chaff which is released at 17.

Clearly many minor detail changes may be made without departing from the spirit and scope of the present invention as recited in the appended claims.

Having thus shown and described my invention, I claim:

1. A threshing machine grain separator of the class described, comprising a blower fan having an outlet at the rear thereof, a shaker pan above said fan with its rear end substantially in vertical alignment with said outlet, a chaffer sieve in rear of said shaker pan adapted at its front end to receive the grain and chaff by gravity from the rear end of the shaker pan, a grain pan below said chaffer sieve with its rear end a short distance below and in rear of the rear end of said chaffer sieve and extending forwardly and downwardly with its front end terminating a short distance in rear of said outlet and substantially midway vertically thereof, a dressing sieve positioned under said grain pan with its rear end a distance below the rear end of the grain pan and its front end a short distance below and in front of the front end of the grain pan, a gate valve hingedly mounted at its rear corners adjacent the front end of said dressing sieve and having means for manual adjustment to thereby optionally deliver more or less air from the fan above and below said grain pan and dressing sieve, a rear end-gate the upper portion being a distance in rear of said grain pan, the upper edge terminating a distance above the horizontal plane of the rear end of the grain pan, a tailings trough having a conveyor and means associated with said end-gate adapted to deliver the tailings into the tailings trough, a grain trough having a conveyer and positioned between said outlet and tailings trough, another grain pan, the rear end positioned adjacent the rear end of said dressing sieve and extending forwardly and downwardly into said grain trough.

2. A device as recited in claim 1 including: a relatively narrow gathering element positioned on the front end of said dressing sieve having means whereby the grain and chaff are received and distributed over the dressing sieve.

3. A device as recited in claim 1 including: said gate valve being very narrow at its front edge and having considerable width at its rear edge and being positioned whereby the air is delivered without interference above said gathering element and below said dressing sieve.

4. A device as recited in claim 1 including: an adjustably mounted extension on the rear end of said first grain pan and for the width thereof having its rear edge curved upwardly, whereby the width of the air passageway between the end-gate and said adjustable extension may be regulated manually.

THOMAS CARROLL.